Patented July 20, 1937

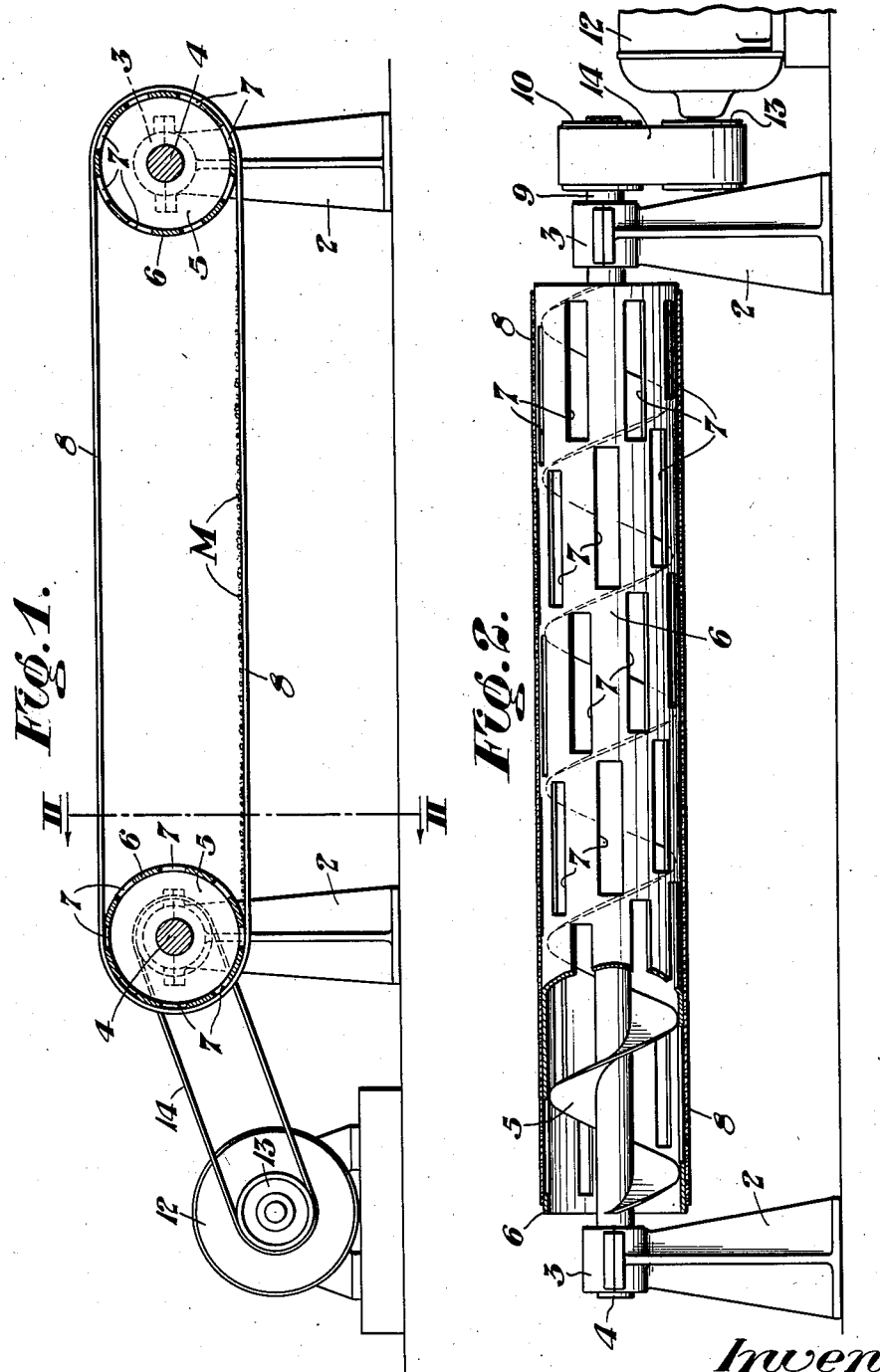

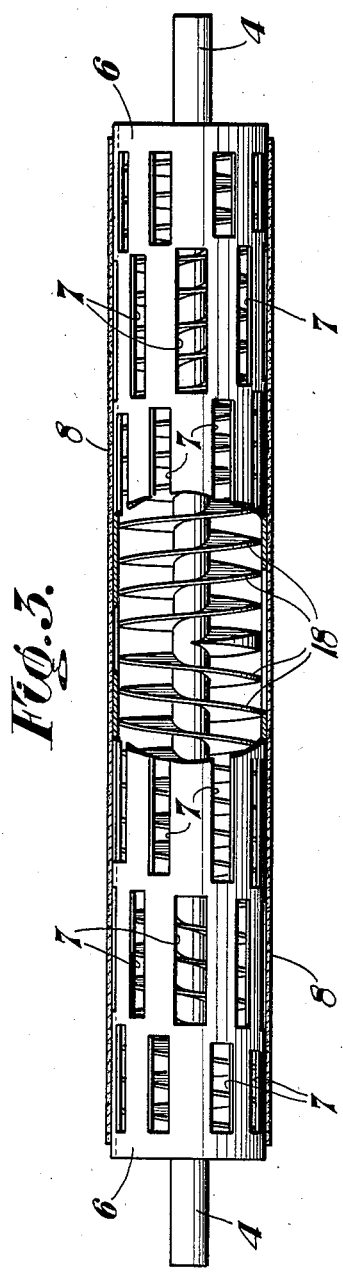

2,087,813

UNITED STATES PATENT OFFICE 2,087,813

MATERIAL HANDLING DEVICE

Rolland E. Peterson, Aetna, Ind., assignor to American Sheet and Tin Plate Company, a corporation of New Jersey Application March 2, 1935, Serial No. 9,089

2 Claims. (Cl. 198—230)

This invention relates to a material handling device and more particularly to one which is adapted for use in combination with an endless conveyer belt, although not limited thereto.

In the art of material handling it is often very desirable to remove material transversely from the direction of travel of an endless conveyer belt. Although there are numerous devices of the prior art for effecting this transverse movement they are for the most part expensive to install and maintain.

In the art of sand blasting, by way of example, an abrasive material, such as sand and the like, is impelled under high pressure against the material to be cleaned as it is moved along the top surface of the upper plane of an endless traveling conveyer belt. Due to its velocity the abrasive material rebounds from the work-piece and some of it collects on the top surface of the bottom plane of the belt and works considerable hardship. Although these endless conveyer belts are somewhat elastic and durable, the very nature of the abrasive material and the necessary tensioning of the belt results in deleterious action on the latter if the abrasive is permitted to remain thereon and pass between it and the supports around which it travels.

Heretofore it has been necessary to construct deep pits beneath the abrading machine and deflect the lower plane of the endless belt thereinto. In this manner the abradant which collects on the upper surface of the lower plane of the belt is prevented, by gravity, from passing between the belt and its supports.

The cost of attempting to cope with the situation in this manner is practically prohibitive, due to the extreme but necessary length of the belt and the construction of the pit. The desired tensioning of the belt cannot be maintained unless at least one additional roll is disposed in the pit and if this is done the deleterious action previously mentioned will result at this point.

It is among the objects of the present invention to provide a novel material handling device which is particularly adapted to effectively remove abradant from the upper surface of the lower plane of a substantially horizontally disposed endless conveyer belt, and one which at the same time is very easy and cheap to install and maintain.

These and further objects will be apparent after referring to the drawings, in which:

Figure 1 is a side elevation of the device of the invention.

Figure 2 is a cross-section taken on the line II—II of Figure 1.

Figure 3 is a modification.

Referring more particularly to the drawings, the numeral 2 designates a plurality of supports, on each pair of which there is disposed a pair of alined bearings 3.

A shaft 4 is rotatably disposed in each pair of alined bearings 3, and in substantial parallelism to each other. A spiral conveying screw 5 is mounted on each of the shafts 4, integrally or otherwise, and each provided with an enclosing shell 6 which is suitably apertured as at 7. Referring to Figure 2 of the drawings, it is to be noted that these apertures 7 are in the form of longitudinally extending slots arranged in staggered relationship. An endless conveyer belt 8 is disposed around the conveying screws 5, and in tensioned contact with both of the shells 6.

One end of one of the shafts 4 is extended, as at 9, and has secured thereto a pulley 10. A reversible motor 12 is suitably disposed adjacent the pulley 10 and carries on its driving shaft a pulley 13. A power belt 14 is mounted around pulleys 10 and 13 in order that the motor 12, upon energization, may rotate the adjacent shaft 4, and accordingly the endless conveyer belt 8.

The material to be handled is disposed, as at M, upon the top surface of the lower plane of the endless belt 8 prior to its removal therefrom. This material may be of any shape or size, depending, of course, upon the size of the elements of the device of the invention. In the present instance the material M is an abradant which has been suitably bombarded at objects disposed upon the upper plane of the endless conveyer belt 8, arriving upon the lower plane thereof by its rebound against the housing of a conventional abrading machine, the details of which are well known in the art and therefore not shown.

It is to be understood, however, that the device of the invention may be employed with a substantially horizontally disposed endless conveyer belt 8 whose upper plane is not utilized for any purpose whatsoever, the material to be handled being positively disposed upon the lower plane thereof for subsequent removal in a direction which is transverse to its axis.

As the material M is moved into contact with the shell 6 it will be forced through the various apertures 7 and transversely conveyed from the belt 8 by the flights of the spiral conveying screw 5. A suitable tray (not shown) is disposed at the exit end of the active spiral conveying screw 5 (depending, of course, upon the direction of movement of the endless conveyer belt 8) for the purpose of collecting the material handled thereby; or, if desired, a conventional conveyer utilized in lieu thereof.

If desired, the material M may be transversely removed from the top surface of the lower plane of the endless conveyer belt 8 simultaneously in both directions, and accordingly the teaching of the invention contemplates the provision of a combined right-and-left hand spiral conveying screw 18, as shown in Figure 3.

While I have shown and described several specific embodiments of my invention, it will be understood that I do not wish to be limited exactly thereto, since various modifications may be made without departing from the scope of the invention, as defined by the following claims.

I claim:

1. In a material handling device, an endless conveyer belt and means for supporting the same, said last named means comprising a roller having orifices to remove material from said belt and a spiral conveyer within said roller.

2. In a material handling device, an endless conveyer belt and means for supporting the same, said last named means comprising a roller having orifices to remove material from said belt and a double spiral conveyer within said roller.

ROLLAND E. PETERSON.